United States Patent Office 2,838,548
Patented June 10, 1958

2,838,548

6α-FLUORO-16α-HYDROXY-4-PREGNENES

Barney J. Magerlein, Kalamazoo, William P. Schneider, Kalamazoo Township, Kalamazoo County, and Oldrich K. Sebek and George B. Spero, Kalamazoo, Mich., assignors to The Upjohn Company, Kalamazoo, Mich., a corporation of Michigan No Drawing. Application February 19, 1958
Serial No. 716,027

9 Claims. (Cl. 260—397.45)

The present invention relates to steroid compounds and is more particularly concerned with 6α-fluoro-16α-hydroxy-hydrocortisone (6α-fluoro-11β,16α,17α,21-tetrahydroxy-4-pregnene-3,20-dione), 6α,9α-difluoro-16α-hydroxy-hydrocortisone (6α,9α-difluoro-11β,16α,17α,21-tetrahydroxy-4-pregnene-3,20-dione), the 16,21-diesters thereof, the 11-keto analogues and the 16,21-diesters thereof, and a method for the production thereof.

The novel compounds of this invention are illustratively represented by the following formula:

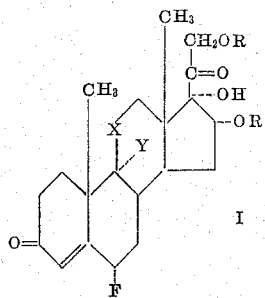

wherein Y is selected from the group consisting of hydrogen and fluorine, X is selected from the group consisting of the carbonyl radical (>C=O) and the β-hydroxymethylene radical

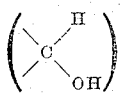

and R is selected from the group consisting of hydrogen and the acyl radical of an organic carboxylic acid, preferably a hydrocarbon carboxylic acid containing from one to twelve carbon atoms, inclusive.

The new compounds, 6α-fluoro-16α-hydroxyhydrocortisone, 6α,9α-difluoro-16α-hydroxyhydrocortisone, their 16,21-diesters and the 11-keto analogues and the esters thereof, are highly active adrenocortical hormones having greater glucocorticoid and anti-inflammatory activity than hydrocortisone or cortisone. In addition these compounds have diuretic activity and have salt-losing properties which make them especially well suited in the management of chronic congestive heart failure and in the treatment of cirrhosis of the liver, the nephrotic and adrenogential syndromes and the treatment of eclampsia and preeclampsia.

The novel 6α-fluoro-16α-hydroxyhydrocortisone, 6α,9α-difluoro-16α-hydroxyhydrocortisone, the 16,21-diesters thereof, the 11-keto analogues and the 16,21-diesters thereof can be given in oral, parenteral or topical compositions. The compounds can be administered to the animal organism in conventional dosage forms such as pills, tablets and capsules for oral use or in conventional liquid forms as are used with natural and synthetic cortical steroid hormones for injection use. For topical use they can be administered in the form of ointments, creams, lotions, and the like with or without co-acting antibiotics, germicides and the like.

The process of the present invention comprises microbiological hydroxylation of 6-fluorohydrocortisone and 6α,9α-difluorohydrocortisone to produce the corresponding 16-hydroxy compounds. Esterification of the thus-produced 16-hydroxylated compounds is productive of the 16,21-diesters. The corresponding 11-keto analogues of these 16-hydroxylated compounds are obtained by oxidation of the 11-hydroxyl group of the above 16,21-diester compounds with an oxidation agent such as chromic acid. If the free alcohols of the 11-keto compounds are desired, the additional step of hydrolyzing the 16,21-diesters, such as with an alkali metal base, is necessary.

Starting materials for the present invention are 6α-fluorohydrocortisone and 6α,9α-difluorohydrocortisone, prepared as shown in the preparations.

In the bioconversion step of the present invention, the operational conditions and reaction procedure and details may be those already known in the art of steroid bioconversion as illustrated by the Murray et al. U. S. Patent 2,602,769, issued July 8, 1952, utilizing, however, the action of an organism of the genus Streptomyces. Among the species which are useful in the fermentation step of the present invention are *Streptomyces roseochromogenus* (Waksman Collection No. 3689), *Streptomyces sp.* (A. T. C. C. 11009), and *Streptomyces roseochromogenus* (A. T. C. C. 3347).

The selected species of actinomycete is grown on a medium suitably containing assimilable non-steroidal carbon, illustratively carbohydrates, such as dextrose; assimilable nitrogen, illustratively soluble or insoluble proteins, peptones or amino acids; and mineral constituents, illustratively sodium or ammonium phosphate and magnesium sulfate. The medium may desirably have a pH before inoculation of between about 6.5 to about 7.8 though a higher or lower pH may be used. A pH of between about 6.8 and about 7.4 is preferred for the growth of actinomycetes and a temperature range from about twenty to about 35 degrees centigrade with about twenty to 32 degrees centigrade preferred.

The growth period required before the steroid to be fermented is exposed to the actinomycete does not appear to be critical, for example, the steroid may be added either before sterilization of the medium, at the time of inoculating the medium, or at sometime later, for example, 24 to 48 hours later. The addition of steroid substrate to be fermented may be accomplished in any suitable manner, such as by dispersing the steroid substrate, either alone with a dispersing agent, or in solution in an organic solvent. Either submerged or surface culture procedures may be used with facility, although submerged culture is preferred.

The temperature during the period of fermentation of the steroid may be the same as that found suitable for the growth of the organism. It need be maintained only within such range as supports life, active growth, or the enzyme activity of the organism (Streptomycete).

The time required for the fermentation of the steroid varies somewhat with the procedure. When the steroid is added to the actinomycete after substantial growth of the organism, for example, after sixteen to 24 hours at optimum temperature, the conversion of steroid substrate begins immediately and is substantially complete in from two to ten days, five days being generally satisfactory.

After completion of the steroid fermentation, the resulting transformed steroid is recovered from the fermentation reaction mixture by extracting the fermentation reaction mixture, including the fermentation liquor and mycelium with an organic solvent for steroids, for example, methyl isopropyl ketone, methylene chloride, chloroform, carbon tetrachloride, ethylene chloride, trichloroethylene, ether, amyl acetate, benzene, and the like. The fermentation liquor and mycelium can be separated and then separately extracted with suitable solvents. The extracts can be combined, either before or after washing with an alkaline solution, illustratively sodium bicarbonate, suitably dried, as for example, over anhydrous sodium sulfate, and the resulting purified transformed steroid obtained by recrystallization from organic solvents, by trituration or by chromatography in order to isolate the thus obtained steroids from the other transformation products.

Bioconversion of 6α-fluorohydrocortisone and 6α,9α-difluorohydrocortisone, according to the fermentation procedure above described, is productive of 6α-fluoro-11β,16α,17α,21-tetrahydroxy-4-pregnene-3,20-dione and 6α,9α- difluoro-11β,16α,17α,21-tetrahydroxy-4-pregnene-3,20-dione, respectively.

The 16-hydroxylated compounds thus produced can be esterified to produce the corresponding 16,21-diesters. This reaction can be performed under esterification conditions known in the art, e. g., by the reaction of the hydroxy compound with the selected acid halide, e. g., acid chloride or acid bromide, the anhydride of a hydrocarbon carboxylic acid, or by reaction with the selected acid, in the presence of an esterification catalyst or with an ester under ester exchange reaction conditions. Reaction conditions which are apt to affect the labile 11β-hydroxy group or 6-fluoro group should be avoided. Compounds thus produced include the 16,21-diacyloxy compounds represented by Formula I wherein X is β-hydroxymethylene radical and wherein R is the acyl radical of an organic carboxylic acid, preferably a hydrocarbon carboxylic acid containing from one to twelve carbon atoms, inclusive, e. g., formic, acetic, propionic, butyric, isobutyric, valeric, isovaleric, trimethylacetic, 2-methylbutyric, 3-ethylbutyric, hexanoic, diethylacetic, triethylacetic, heptanoic, octanoic, α-ethylisovaleric, succinic, a cyclic acid, e. g., cyclopropylideneacetic, cyclopentylformic, cyclopentylacetic, β-cyclohexylpropionic, cyclohexylformic, cyclohexylacetic, an aryl or alkaryl acid, e. g., benzoic, 2-, 3-, or 4-methylbenzoic, 2,3-, 2,4-, 2,5-, 2,6-, 3,4-, and 3,5-dimethylbenzoic, ethylbenzoic, 2,4,6-trimethylbenzoic, 2,4,6-triethylbenzoic, α-naphthoic, 3-methyl-α-naphthoic, an aralkyl acid, e. g., phenylacetic, phenylpropionic, diphenylacetic, triphenylacetic, an unsaturated acid, e. g., acrylic, maleic, vinyl acetic, propiolic, undecolic, etc. Illustrative of the esters thus produced are the 16,21-diacylates such as 6α-fluoro-11β,16α,17α,21-tetrahydroxy-4-pregnene-3,20-dione 16,21-diacetate, 6α,9α-difluoro-11β,16α,17α, 21 - tetrahydroxy-4-pregnene-3,20-dione 16,21-diacetate, and the like.

The 11β-hydroxyl of the thus produced 16,21-diester compounds can be oxidized to the corresponding 11-ketone with an oxidizing agent. Oxidizing agents such as chromic acid, potassium dichromate, a halo-amide, and the like are operative. The oxidation can be carried out by a variety of methods, such as, for example, by oxidizing the said 11β-hydroxy steroid in acetic acid-water solution with chromium trioxide, using molar quantities or a slight excess, such as from ten to thirty percent excess, or by oxidizing with a haloamide or imide of an acid, such as N-bromoacetamide, N-chlorosuccinimide, or N-bromosuccinimide dissolved in pyridine, dioxane, or other suitable solvents. At the conclusion of the desired oxidation reaction, the excess oxidant is generally destroyed by addition of methyl alcohol, ethyl alcohol, and the like for the chromic acid oxidant or a bisulfite for N-bromoacetamide, N-bromosuccinimide and other N-haloacylamides and imides. Thereafter, the resulting 11-keto product is recovered by conventional means, such as by dilution with water and extraction with a water-immiscible solvent, e. g., methylene chloride, ether, benzene, toluene, ethyl acetate, or the like. Illustrative of the 11-keto 16,21-diesters thus produced are for example 6α-fluoro-16α,17α,21-trihydroxy-4-pregnene-3,11,20-trione 16,21-diacetate, 6α,9α-difluoro-16α,17α,21-trihydroxy-4- pregnene - 3,11,20 - trione 16,21-diacetate, and the like.

The 11-keto 16,21-diesters thus produced may, if desired, be converted to the free alcohols i. e., 6α-fluoro-16α,17α,21-trihydroxy-4-pregnene-3,11,20-trione, and 6α,-9α-difluoro-16α,17α,21-trihydroxy-4-pregnene-3,11,20 - trione. The alcohols are obtained from the acylates by hydrolysis in accordance with general hydrolysis procedures known in the art. A preferred procedure is to employ an alkali-metal bicarbonate in a substantially oxygen-free solution of a mixture of a lower alkanol and water. The hydrolysis reaction is carried out at a temperature between ten and thirty degrees centigrade while protecting the mixture from atmospheric oxygen. After the hydrolysis is complete, the reaction mixture is neutralized with an acid, e. g., acetic acid, and the hydrolyzed product recovered from the reaction mixture by evaporation and crystallization, extraction with methylene chloride, or the like. The 16,21-diesters when desired can again be prepared by esterification of the hydroxyls by esterification procedures hereinbefore described. The preferred diesters are those derived from an organic carboxylic acid, preferably a hydrocarbon carboxylic acid containing from one to twelve carbon atoms, inclusive.

The following preparations and examples are illustrative of the process and products of the present invention but are not to be construed as limiting.

PREPARATION 1

*The 3-ethylene ketal of methyl 3,11-diketo-5α,6α-oxido-17(20)-[cis]-pregnen-21-oate*

To a solution of 5.0 grams of the 3-ethylene ketal of methyl 3,11-diketo-4,17(20)-[cis]-pregnadien-21-oate, prepared in the manner described in U. S. Patent 2,707,184, in 100 milliliters of chloroform was added a chilled solution of 1.9 grams of perbenzoic acid dissolved in 31.5 milliliters of chloroform. The solution was maintained at about four degrees centigrade for 24 hours, and then at room temperature for 72 hours. The solution was then washed with a five percent aqueous solution of sodium bicarbonate and then with water. The chloroform layer was separated, dried and the solvent distilled to give a residue of 5.3 grams of solid. Crystallization of this solid from methanol gave 2.24 grams of product melting at 180 to 195 degrees centigrade and after two crystallizations from methanol, there was obtained pure 3-ethylene ketal of methyl 3,11-diketo-5α,6α-oxido-17(20)-[cis]-pregnen-21-oate melting at 206 to 209 degrees centigrade having an $[\alpha]_D$ of plus 37 degrees ($CHCl_3$) and having the analysis given below:

*Analysis.*—Calculated for $C_{24}H_{32}O_6$: C, 69.20; H, 7.75. Found: C, 69.59; H, 7.81.

PREPARATION 2

*Methyl 3,11-diketo-5α-hydroxy-6β-fluoro-17(20)-allopregnen-21-oate*

To a solution of 1.73 grams of 3-ethylene ketal of methyl 3,11 - diketo-5α,6α-oxido-17(20)-[cis]-pregnen-21-oate in sixteen milliliters of methylene chloride was added six milliliters of 48 percent hydrofluoric acid. The heterogeneous mixture was stirred for two hours, made slightly basic with 300 milliliters of five percent sodium bicarbonate solution, and extracted with methylene chloride. The extract was washed, dried and evaporated to dryness to give 1.62 grams of crude solid. Chromatography gave two fractions: A, 431 milligrams eluted with methylene chloride plus five percent acetone and B, 921 milligrams eluted with methylene chloride plus ten and twenty percent acetone. Crystallization of fraction A from acetone-Skellysolve B hexanes gave 390 milligrams of methyl 3,11 - diketo-5α-hydroxy-6β-fluoro-17(20)-allopregnen-21-oate, melting point 254 to 260 degrees centigrade. An analytical sample melted at 260 to 263 degrees centigrade.

*Analysis.*—Calculated for $C_{22}H_{29}O_5F$: F, 4.84. Found: F, 4.47.

PREPARATION 3

*Methyl 3,11-diketo-5α-hydroxy-6β-fluoro-17(20)-allopregnen-21-oate 3-ethylene ketal*

A mixture of 1.9 grams of methyl 3,11-diketo-5α-hydroxy-6β-fluoro-17(20)-allopregnen-21-oate, 59 milligrams of p-toluenesulfonic acid monohydrate and 31 milliliters of distilled ethylene glycol was added to 800 milliliters of benzene. The mixture was stirred and refluxed for two hours, with the condensate passing through a water trap to remove the water. After reflux the mixture was cooled, washed with water and evaporated to dryness to give a crude solid which on recrystallization from acetone-Skellysolve B hexanes gave 1.96 grams of methyl 3,11-diketo-5α-hydroxy-6β-fluoro-17(20)-allopregnen - 21 - oate 3-ethylene ketal, melting point 170 to 173 degrees centigrade.

PREPARATION 4

*5α,11β,21-trihydroxy-6β-fluoro-17(20)-allopregnen-3-one 3-ethylene ketal*

To a solution of 1.96 grams of methyl 3,11-diketo-5α-hydroxy-6β-fluoro-17(20)-allopregnen-21-oate 3 - ethylene ketal in 850 milliliters of anhydrous ether was added 3.7 grams of lithium aluminum hydride and the mixture was stirred for a period of one hour. 200 milliliters of water was added slowly and the ether phase separated. The aqueous phase was extracted with ethyl acetate and the extracts added to the ether phase. The combined ether-ethyl acetate solution was washed with water, dried and evaporated to dryness under reduced pressure. The crude solid residue was crystallized from acetone-Skellysolve B hexanes to give 1.30 grams of 5α,11β,21-trihydroxy-6β-fluoro-17(20)-allopregnen-3-one 3-ethylene ketal, melting point 197 to 205 degrees centigrade. An additional 226 milligrams was obtained from the mother liquor, melting point 175 to 185 degrees centigrade.

PREPARATION 5

*5α,11β-dihydroxy-6β-fluoro-21-acetoxy-17(20)-allopregnen-3-one 3-ethylene ketal*

The acetate was prepared by allowing 0.87 gram of 5α,11β,21 - trihydroxy-6β-fluoro-17(20)-allopregnen-3-one 3-ethylene ketal to stand overnight in ten milliliters of acetic anhydride and ten milliliters of pyridine. The solution was then poured into ice water to give 0.92 gram of 5α,11β-dihydroxy-6β-fluoro-21-acetoxy-17(20)-allopregnen-3-one 3-ethylene ketal, melting point 140 to 150 degrees centigrade, which on recrystallization from acetone-Skellysolve B hexanes gave 0.77 gram, melting point 149 to 153 degrees centigrade.

PREPARATION 6

*5α,11β,17α-trihydroxy-6β-fluoro-21-acetoxy-allopregnane-3,20-dione 3-ethylene ketal*

To a solution of 0.77 gram of 5α,11β-dihydroxy-6β-fluoro-21-acetoxy-17(20)-allopregnen - 3 - one 3-ethylene ketal in 35 milliliters of tertiary butyl alcohol was added one milliliter of pyridine, 1.9 milliliters of 1.95 molar tertiary butyl alcohol solution of N-methylmorpholine oxide peroxide, and 13.1 milligrams of osmium tetroxide (9.1 milliliters of tertiary butyl alcohol solution containing 1.44 milligrams $OsO_4$ per milliliter). The solution was stirred for a period of 2.5 hours, fifteen milliliters of five percent sodium hydrosulfite added, stirred for an additional ten minutes, 0.7 gram of finely ground synthetic magnesium silicate added, stirred for a period of twenty minutes more and filtered. The filtrate was taken to dryness under reduced pressure (below fifty degrees centigrade) and the residue dissolved in methylene chloride, washed with water, dried and evaporated to dryness. This residue was crystallized from acetone-Skellysolve B hexanes to give 0.47 gram of 5α,11β,17α-trihydroxy-6β-fluoro-21-acetoxy-allopregnane - 3,20 - dione 3 - ethylene ketal, melting point 220 to 228 degrees centigrade.

PREPARATION 7

*5α,11β,17α-trihydroxy-6β-fluoro-21-acetoxy-allopregnane-3,20-dione*

A solution of 0.47 gram of 5α,11β,17α-trihydroxy-6β-fluoro-21-acetoxyallopregnane-3,20-dione 3-ethylene ketal in 35 milliliters of acetone and four milliliters of one normal sulfuric acid solution was gently boiled on the steam bath for ten minutes, cooled and neutralized with dilute sodium bicarbonate solution. Addition of water and cooling gave 0.33 gram of 5α,11β,17α-trihydroxy-6β-fluoro-21-acetoxy-allopregnane-3,20-dione, melting point 230 to 240 degrees centigrade.

PREPARATION 8

*6β-fluoro-11β,17α-dihydroxy-21-acetoxy-4-pregnene-3,20-dione (6β-fluorohydrocortisone acetate)*

A solution of 100 milligrams of 5α,11β,17α-trihydroxy-6β-fluoro-21-acetoxyallopregnane-3,20-dione in 4.9 milliliters of acetic acid and 0.1 milliliter of water was refluxed for a period of one hour, cooled, diluted with fifty milliliters of water and evaporated to dryness under reduced pressure. The residue was chromatographed over Florisil (synthetic magnesium silicate) to give one fraction (77 milligrams) eluted with methylene chloride plus ten percent acetone. Crystallization from acetone-Skellysolve B hexanes gave 38 milligrams of 6β-fluoro-11β,17α-dihydroxy-21-acetoxy-4-pregnene-3,20-dione (6β-fluorohydrocortisone acetate), melting point 210 to 218 degrees centigrade. Infrared data and ultraviolet data were found to be in agreement with the structure.

PREPARATION 9

*Isomerization of 6β- to 6α-fluorohydrocortisone acetate*

A solution of 0.132 gram of 6β-fluorohydrocortisone acetate in twelve milliliters of chloroform and 0.1 milliliter of absolute alcohol was cooled to minus ten degrees centigrade in an ice-salt bath and a stream of anhydrous hydrochloric acid was gently bubbled through the solution for 2.5 hours while the temperature was maintained between minus five and minus fifteen degrees centigrade. The solution was then diluted with 25 milliliters of chloroform, washed with dilute sodium bicarbonate and water, dried over anhydrous sodium sulfate, and evaporated to dryness under reduced pressure at sixty degrees centigrade or less. Crystallization of the residue from acetone-Skellysolve B gave 42 milligrams of product, 6α-fluorohydrocortisone acetate, melting point 203 to 210 degrees centigrade.

PREPARATION 10

*6α-fluoro-11β,17α,21-trihydroxy-4-pregnene-3,20-dione (6α-fluorohydrocortisone)*

A solution of 1.1 grams of 6α-fluorohydrocortisone acetate, 1.0 gram of potassium bicarbonate, 100 milliliters of methanol and fifteen milliliters of water was purged with nitrogen and stirred at 25 degrees centigrade for four hours. The solution was then neutralized by addition of acetic acid and the methanol was removed by distillation under reduced pressure. The residue was extracted with 100 milliliters of methylene dichloride and the extract, after drying over sodium sulfate, was chromatographed over a column of eighty grams of synthetic magnesium silicate. The product fraction was eluted with Skellysolve B hexanes plus twenty and thirty percent acetone and gave 770 milligrams of 6α-fluorohydrocortisone which melted at 192 to 195 degrees centigrade after crystallization from ethyl acetate-Skellysolve B hexanes. An analytical sample melted at 192 to 201 degrees centigrade and had a rotation of $[α]_D$ plus 127 degrees (chloroform).

Analysis.—Calcd. for $C_{21}H_{29}O_5F$: C, 66.29; H, 7.68; F, 4.99. Found: C, 66.28; H, 7.65; F, 4.43.

PREPARATION 11

*6α-fluoro-17α,21-dihydroxy-4,9(11)-pregnadiene-3,20-dione 21-acetate*

To a solution of one gram of 6α-fluorohydrocortisone acetate in ten milliliters of pyridine was added 0.4 gram of N-bromoacetamide. The mixture was allowed to stand under nitrogen for twenty minutes, at which time it was cooled to five degrees centigrade. While stirring, anhydrous sulfur dioxide was passed over the surface until the solution gave no color change with acidified starch-iodide paper. The temperature of the reaction mixture was not allowed to go above twenty degrees centigrade during the sulfur dioxide addition. The mixture was then allowed to stand for five minutes and was poured into 100 milliliters of ice-water, resulting in precipitation of 915 milligrams of crude solid, melting point 190 to 202 degrees centigrade. Crystallization from acetone gave 511 milligrams of 6α-fluoro-17α,21-dihydroxy-4,9(11)-pregnadiene-3,20-dione 21-acetate, melting point 214 to 218 degrees centigrade. An analytical sample melted at 220 to 227 degrees centigrade. Analysis gave $[\alpha]_D$ plus 73 degrees (acetone) and the following:

Analysis.—Calcd. for $C_{23}H_{29}O_5$: C, 68.30; H, 7.23; F, 4.70. Found: C, 68.77; H, 7.57; F, 4.77.

PREPARATION 12

*6α-fluoro-9α-bromo-11β,17α,21-trihydroxy-4-pregnene-3,20-dione 21-acetate (6α-fluoro-9α-bromo-hydrocortisone acetate)*

To a solution of 420 milligrams of 6α-fluoro-17α,21-dihydroxy-4,9(11)-pregnadiene-3,20-dione 21-acetate in 6.5 milliliters of methylene chloride was added 12.5 milliliters of tertiary butyl alcohol, a solution of 1.0 milliliter of 72 percent perchloric acid in 75 milliliters of water, and a solution of 182 milligrams of N-bromoacetamide in 3.2 milliliters of tertiary butyl alcohol. After stirring for fifteen minutes, a solution of 182 milligrams of sodium sulfite in ten milliliters of water was added and the mixture concentrated under reduced pressure at sixty degrees centigrade until crystallization occurred. After cooling in an ice bath, thirty milliliters of water was added with stirring. The crystalline product was filtered, washed with water and dried, giving a yield of 480 milligrams of essentially pure 6α-fluoro-9α-bromo-11β,17α,21-trihydroxy-4-pregnene-3,20-dione 21-acetate, melting point 163 to 166 degrees centigrade (with decomposition). The product can be used in the succeeding example without further purification.

PREPARATION 13

*6α-fluoro-9β,11β-oxido-17α,21-dihydroxy-4-pregnene-3,20-dione 21-acetate*

A mixture of 2.816 grams of 6α-fluoro-9α-bromo-11β,17α,21-trihydroxy-4-pregnene-3,20-dione 21-acetate (6α-fluoro-9α-bromohydrocortisone acetate, 2,8,6 grams of potassium acetate, and ninety milliliters of acetone was stirred and heated at reflux temperature for eighteen hours. The reaction mixture was then concentrated to about one-half the original volume and cooled in an ice bath. Addition of 250 milliliters of water gave 2.264 grams of 6α-fluoro-9β,11β-oxido-17α,21-dihydroxy-4-pregnene-3,20-dione 21-acetate, melting point 195 to 200 degrees centigrade with decomposition. The analytical sample, recrystallized from acetone, melted at 197 to 200 degrees centigrade. Analysis gave $[\alpha]_D$ plus 28 degrees (acetone) and the following:

Analysis.—Calcd. for $C_{23}H_{29}O_6F$: C, 65.70; H, 6.95; F, 4.52. Found: C, 65.76; H, 7.03; F, 4.24.

PREPARATION 14

*6α,9α-difluoro-11β,17α,21-trihydroxy - 4 - pregnene-3,20-dione 21-acetate (6α,9α-difluorohydrocortisone acetate)*

To 3.41 grams of liquid hydrogen fluoride cooled in a Dry-Ice bath was added, portion-wise, a slurry of 1.875 grams of 6α-fluoro-9β,11β-oxido - 17α,21 - dihydroxy-4-pregnene-3,20-dione 21-acetate in 5.97 grams of tetrahydrofuran (distilled over sodium hydroxide) and twenty milliliters of methylene chloride which had similarly been cooled in a Dry-Ice bath. The steroid dissolved completely. After standing at zero to five degrees centigrade for seventeen hours, the reaction mixture was poured slowly into a stirred mixture of 300 milliliters ice-water, fifty milliliters of methylene chloride, and twenty grams of sodium bicarbonate. The mixture was stirred for a few minutes, the methylene chloride layer was separated and the water phase extracted with two fifty-milliliter portions of fresh methylene chloride. The combined methylene chloride solutions were washed with water and dried. Attempts to crystallize the product by addition of Skellysolve B hexanes gave only oil. The oil was again dissolved by addition of methylene chloride and chromatographed over synthetic magnesium silicate. One long fraction of 1.496 grams of crystalline product came down from the column, which, according to papergram analysis, was a mixture of several components.

The whole column fraction was acetylated overnight with ten milliliters of acetic anhydride in ten milliliters of pyridine. The acetylation mixture was poured into ice-water and extracted with methylene chloride. The extract was washed with dilute acid, dilute base, water, dried and put over a synthetic magnesium silicate column. The fraction (1.075 grams) eluted from the column with fifteen and twenty percent acetone in Skellysolve B hexanes, was recrystallized several times and gave 180 milligrams of constant melting product, 6α,9α-difluorohydrocortisone acetate, melting point 220 to 225 degrees centigrade. Analysis gave $[\alpha]_D$ plus 115 degrees (acetone) and the following:

Analysis.—Calcd. for $C_{23}H_{30}O_6F_2$: C, 62.71; H, 6.87; F, 8.63. Found: C, 62.85; H, 7.22; F, 8.67.

PREPARATION 15

*6α,9α-difluoro-11β,17α,21-trihydroxy - 4 - pregnene-3,20-dione (6α,9α-difluorohydrocortisone)*

Nitrogen was bubbled through a solution of 0.33 gram of 6α,9α-difluoro-11β,17α,21-trihydroxy-4-pregnene-3,20-dione 21-acetate (6α,9α-difluorohydrocortisone acetate) in 33 milliliters of methanol for fifteen minutes. To this was added a solution of 0.33 gram of potassium bicarbonate in four milliliters of water, likewise treated with nitrogen. After stirring under nitrogen for five hours, the base was neutralized by the addition of 2.5 milliliters of five percent hydrochloric acid. The mixture was then concentrated under reduced pressure at fifty degrees centigrade to about five milliliters. The residue was taken up in ethyl acetate, washed with water, dried and evaporated to dryness. Crystallization of the residue from acetone-Skellysolve B hexanes yielded 0.27 gram of 6α,9α-difluoro-11β,17α,21-trihydroxy - 4 - pregnene-3,20-dione (6α,9α-difluorohydrocortisone), melting point 210 to 218 degrees centigrade. An analytical sample melted at 214 to 217 degrees centigrade. Analysis gave $[\alpha]_D$ plus 115 degrees (acetone) and the following:

Analysis.—Calcd. for $C_{21}H_{28}O_5F_2$: C, 63.30; H, 7.08; F, 9.54. Found: C, 63.60; H, 7.39; F, 8.48.

EXAMPLE 1

*6α-fluoro - 11β,16α,17α,21 - tetrahydroxy - 4 - pregnene-3,20-dione*

One hundred milliliters of two percent cornsteep liquor of sixty percent solids was adjusted to pH of 6.8 to 7.4 with sodium hydroxide and was sterilized at fifteen pounds pressure for thirty minutes. To this was added a similarly sterile solution of two grams of Cerelose (technical grade of dextrose) in four milliliters of water. This sterile medium was inoculated with a suspension of spores and mycelium of *Streptomyces roseochromogenus* (Waksman Collection No. 3689) and was agitated on a rotatory shaker for a period of 24 hours by which time a good growth of the organism had taken place. To this 24-hour culture, twenty milligrams of 6α-fluorohydrocortisone dissolved in 0.2 milliliter of dimethylformamide was added. Incubation of the steroid with the microorganism was maintained (with agitation) for five days, at which time the pH was 8.6. The fermentation broth was then separated into the mycelium and the beer by centrifugation. The mycelium was extracted first with two 25-milliliter portions of acetone and then with four successive 25-milliliter portions of methyl isopropyl ketone. The beer was extracted with four successive 25-milliliter portions of methyl isopropyl ketone. All of the extracts were combined, washed with two percent aqueoue sodium bicarbonate solution and with water, dried with anhydrous sodium sulfate, and evaporated to dryness. The residue, which on paper chromatogram analysis showed the presence of 6α-fluoro-11β,16α,17α,21-tetrahydroxy-4-pregnene-3,20-dione, was purified by chromatography over synthetic magnesium silicate (Florisil) and crystallization from acetone to give 6α-fluoro-11β,16α,17α,21-tetrahydroxy-4-pregnene-3,20-dione.

Following the procedure of Example 1 above, but substituting 6α,9α-difluorohydrocortisone as starting material therein, is productive of 6α,9α-difluoro-11β,16α,17α,21-tetrahydroxy-4-pregnene-3,20-dione.

Example 2

*6α-fluoro - 11β,16α,17α,21 - tetrahydroxy - 4 - pregnene-3,20-dione 16,21-diacetate*

A solution of 1.2 grams of 6α-fluoro-11β,16α,17α,21-tetrahydroxy-4-pregnene-3,20-dione (from Example 1) in twenty milliliters of pyridine and twenty milliliters of acetic anhydride was allowed to stand at room temperature (about 25 degrees centigrade) for eighteen hours and was then poured into 200 milliliters of ice-water. The resulting mixture was extracted with methylene chloride and the extract was washed with dilute hydrochloric acid, dilute sodium bicarbonate, and water. After drying the solution with anhydrous sodium sulfate, the solvent was removed by evaporation and the residue was purified by chromatography over synthetic magnesium silicate (Florisil) and crystallization from acetone to give 6α-fluoro-11β,16α,17α,21-tetrahydroxy - 4 - pregnene-3,20-dione 16,21-diacetate.

Following the procedure of Example 2 above but substituting 6α,9α - difluoro - 11β,16α,17α,21-tetrahydroxy-4-pregnene-3,20-dione as starting material therein is productive of 6α,9α - difluoro - 11β,16α,17α,21-tetrahydroxy-4-pregnene-3,20-dione 16,21-diacetate.

Similarly, acylation of 6α-fluoro-11β,16α,17α,21-tetrahydroxy-4-pregnene-3,20-dione with the appropriate acid anhydride or acid chloride is productive of still other 16,21-diacylates such as, for example, 6α-fluoro-11β,16α,17α,21 - tetrahydroxy - 4 - pregnene-3,20-dione 16,21-dipropionate, 6α - fluoro - 11β,16α,17α,21-tetrahydroxy-4-pregnene-3,20-dione 16,21-dibutyrate, 6α-fluoro-11β,16α,17α,21-tetrahydroxy-4-pregnene-3,20-dione 16,21 - divalerate 6α - fluoro - 11β,16α,17α,21 - tetrahydroxy-pregnene-3,20-dione 16,21-dihexanoate, 6α-fluoro-11β,16α,17α,21-tetrahydroxy-4-pregnene - 3,20 - dione 16,21 - dilaurate, 6α-fluoro-11β,16α,17α,21-tetrahydroxy - 4 - pregnene-3,20-dione 16,21-di-(trimethylacetate), 6α-fluoro-11β,16α,17α,21-tetrahydroxy-4-pregnene-3,20-dione 16,21-diisobutyrate, 6α-fluoro-11β,16α,17α,21-tetrahydroxy - 4 - pregnene-3,20-dione 16,21-tetrahydroxy-4-pregnene-3,20-dione 16,21-diisovalerate, 6α-fluoro-11β,16α,17α,21-tetrahydroxy-4-pregnene-3,20-dione 16,21-dicyclohexane carboxylate, 6α-fluoro-11β,16α,17α,21-tetrahydroxy-4-pregnene-3,20-dione 16,21-dibenzoate, 6α-fluoro-11β,16α,17α,21-tetrahydroxy-4-pregnene-3,20-dione 16,21-diphenylacetate, 6α-fluoro-11β,16α,17α,21-tetrahydroxy-4-pregnene-3,20-dione 16,21-di-(β-phenyl)-propionate, 6α-fluoro-11β,16α,17α,21-tetrahydroxy-4-pregnene-3,20-dione 16,21-di-(o-, m-, p-toluate), 6β-fluoro-11β,16α,17α,21-tetrahydroxy-4-pregnene-3,20-dione 16,21-dihemisuccinate, 6α-fluoro-11β,16α,17α,21-tetrahydroxy-4-pregnene-3,20-dione 16,21-dihemiadipate, 6α-fluoro - 11β,16α,17α,21-tetrahydroxy-4-pregnene-3,20-dione 16,21 - diacrylate,6α-fluoro-11β,16α,17α,21-tetrahydroxy-4-pregnene-3,20-dione 16,21-diundecylenate, 6α-fluoro-11β,16α,17α,21-tetrahydroxy-4-pregnene-3,20-dione 16,21-dipropiolate, 6α-fluoro-11β,16α,17α,21-tetrahydroxy-4-pregnene-3,20-dione 16,21-dicinnamate, 6α-fluoro-11β,16α,17α,21-tetrahydroxy-4-pregnene-3,20-dione 16,21-dimaleate, 6α-fluoro-11β,16α,17α,21-tetrahydroxy - 4 - pregnene-3,20-dione 16,21-dicitraconate.

Similarly, acylation of 6α,9α-difluoro-11β,16α,17α,21-tetrahydroxy-4-pregnene-3,20-dione, with the appropriate acylating agent is productive of the corresponding 16,21-diacylates. The preferred diacylates are those corresponding to the diacylates described above for 6α-fluoro-11β,16α,17α,21-tetrahydroxy-4-pregnene-3,20-dione.

Example 3

*6α-fluoro-16α,17α,21-trihydroxy-4-pregnene-3,11,20-trione 16,21-diacetate*

To a solution of 0.5 gram of 6α-fluoro-11β,16α,17α,21-tetrahydroxy-4-pregnene-3,20-dione 16,21 - diacetate in twenty milliliters of acetic acid was added a solution of 0.15 gram of chromium trioxide in one-half milliliter of water. The mixture was stirred and maintained at room temperature (about 25 degrees centigrade) for a period of four hours. Thereafter the excess oxidant was destroyed by the addition of 0.5 milliliter of methanol and the mixture was poured into 100 milliliters of water and extracted with methylene chloride. The extract was washed with dilute sodium bicarbonate and with water, and was dried and evaporated to dryness. The residue was crystallized from acetone to give 6α-fluoro-16α,17α,21-trihydroxy-4-pregnene-3,11-20-trione 16,21-diacetate.

Following the procedure of Example 3 above but substituting 6α,9α-difluoro-11β,16α,17α,21 - tetrahydroxy-4-pregnene-3,20-dione 16,21-diacetate, as starting material therein is productive of 6α,9α-difluoro-16α,17α,21-trihydroxy-4-pregnene-3,11,20-trione 16,21-diacetate.

Similarly oxidation of other 11β-hydroxy 16,21-diester compounds of Example 2 is productive of the corresponding 11-keto 16,21-diester compounds. The preferred 11-keto 16,21-diester compounds are those wherein the acyl radical is that of an organic carboxylic acid containing from one to twelve carbon atoms, inclusive.

Example 4

*6α-fluoro-16α,17α,21-trihydroxy-4-pregnene-3-11,20-trione*

A solution of 1.2 grams of 6α-fluoro-16α,17α,21-trihydroxy-4-pregnene-3,11,20-trione 16,21-diacetate, two grams of potassium bicarbonate, 100 milliliters of methanol and fifteen milliliters of water was purged with nitrogen and stirred at 25 degrees centigrade for eight hours. The solution was then neutralized by addition of acetic acid and the methanol was removed by distillation under reduced pressure. The residue was extracted with 100 milliliters of methylene chloride and the extract, after drying over sodium sulfate, was chromatographed over a column of eighty grams of synthetic mangesium silicate. The product fraction was eluted with Skellysolve B hexanes plus thirty percent acetone and gave 6α-fluoro-16α,17α,21-trihydroxy-4-pregnene-3,11,20-trione which was recrystallized from acetone.

Following the procedure of Example 4, saponification of 6α,9α - difluoro-16α,17α,21-trihydroxy-4-pregnene-3,11, 20-trione 16,21-diacetate of Example 3 is productive of 6α,9α-difluoro-16α,17α,21-trihydroxy-4-pregnene-3,11,20-trione.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:
1. A 16-oxygenated pregnene of the formula

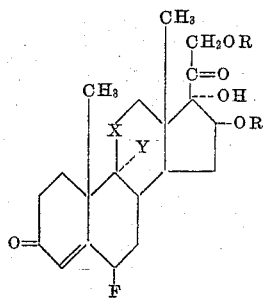

wherein Y is selected from the group consisting of hydrogen and fluorine, X is selected from the group consisting of the carbonyl radical and the β-hydroxymethylene radical, and R is the same member selected from the group consisting of hydrogen and the acyl radical of a hydrocarbon carboxylic acid containing from one to twelve carbon atoms, inclusive.

2. 6α-fluoro-11β,16α,17α,21-tetrahydroxy-4-pregnene-3,20-dione.

3. 6α,9α-difluoro-11β,16α,17α,21-tetrahydroxy-4-pregnene-3,20-dione.

4. 6α-fluoro-16α,17α,21-trihydroxy-4-pregnene-3,11,20-trione.

5. 6α,9α-difluoro-16α,17α,21-trihydroxy-4-pregnene-3,11,20-trione.

6. 6α-fluoro-11β,16α,17α,21-tetrahydroxy-4-pregnene-3,20-dione 16,21-diacetate.

7. 6α,9α-difluoro-11β,16α,17α,21-tetrahydroxy-4-pregnene-3,20-dione 16,21-diacetate.

8. 6α-fluoro-16α,17α,21-trihydroxy-4-pregnene,3,11,20-trione 16,21-diacetate.

9. 6α,9α-difluoro-16α,17α,21-trihydroxy-4-pregnene-3,11,20-trione 16,21-diacetate.

No references cited.

UNITED STATES PATENT OFFICE
Certificate of Correction

Patent No. 2,838,548                                                    June 10, 1958

Barney J. Magerlein et al.

It is hereby certified that error appears in the printed specification of the above numbered patent requiring correction and that the said Letters Patent should read as corrected below.

Column 9, line 66, for "-tetrahydroxy-pregnene-3," read -*tetrahydroxy-4-pregnene-3,*; column 11, lines 13 to 24, claim 1, the formula should appear as shown below instead of as in the patent:

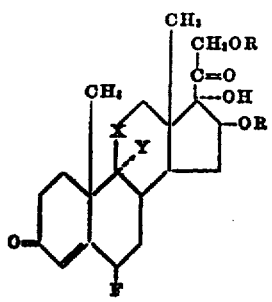

Signed and sealed this 3rd day of February 1959.

[SEAL]

Attest:
KARL H. AXLINE,
*Attesting Officer.*

ROBERT C. WATSON,
*Commissioner of Patents.*

Notice of Adverse Decision in Interference

In Interference No. 90,125 involving Patent No. 2,838,548, B. J. Magerlein, W. P. Schneider, O. K. Sebek and G. B. Spero, 6a-FLUORO-16a-HYDROXY-4-PREGNENES, final judgment adverse to the patentees was rendered Apr. 30, 1964, as to claims 1, 2, 3, 4, 5, 6, 7, 8 and 9.

[*Official Gazette May 4, 1965.*]